United States Patent
Demenitroux et al.

(10) Patent No.: US 11,955,999 B2
(45) Date of Patent: Apr. 9, 2024

(54) DEVICE FOR CONTROLLING A SCANNING ACTIVE ANTENNA

(71) Applicant: THALES, Courbevoie (FR)

(72) Inventors: Wilfried Demenitroux, Cholet (FR); Nicolas Berthou, Gennevilliers (FR); Olivier Jardel, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/555,469

(22) Filed: Dec. 19, 2021

(65) Prior Publication Data
US 2022/0200644 A1 Jun. 23, 2022

(30) Foreign Application Priority Data
Dec. 22, 2020 (FR) ...................... 2013956

(51) Int. Cl.
*H04B 1/04* (2006.01)
*H04B 1/16* (2006.01)

(52) U.S. Cl.
CPC ......... *H04B 1/0483* (2013.01); *H04B 1/1607* (2013.01)

(58) Field of Classification Search
CPC ...... H03F 2200/451; H03F 3/245; H03F 3/19; H03F 3/195; H03F 3/193; H03F 3/68; H03F 3/24; H03F 2200/102; H03F 2200/387; H03F 3/211; H03F 2200/294; H03F 1/0227; H03F 1/0266; H03F 1/56; H03F 3/72; H03F 2200/411; H03F 2200/336; H03F 3/21; H03F 1/0222; H03F 1/565; H04B 2001/0408; H04B 1/04; H04B 1/40; H04B 1/0475; H04B 7/0617; H04B 2001/045; H04B 1/0483; H04B 1/0458; H04B 1/18; H04B 2001/0416; H04B 7/0413; H04B 1/0007; H04B 1/3822; H04B 2001/0425; H04B 1/44; H04B 1/48; H04B 1/525; H04B 1/401; H01Q 3/36; H01Q 3/28; H01Q 21/065; H01Q 21/0025; H01Q 3/34;
(Continued)

(56) References Cited

U.S. PATENT DOCUMENTS 5,644,316 A * 7/1997 Lewis ................... G01S 7/4008
342/174
11,018,425 B1 * 5/2021 Hageman ............... H01Q 3/267
(Continued)

FOREIGN PATENT DOCUMENTS

| EP | 3 134 972 A1 | 3/2017 |
|---|---|---|
| WO | 2019/158207 A1 | 8/2019 |
| WO | 2020/016305 A1 | 1/2020 |

*Primary Examiner* — Golam Sorowar
(74) *Attorney, Agent, or Firm* — BakerHostetler

(57) ABSTRACT

A device for controlling the efficiency of a scanning active antenna includes at least two transmission paths $Tx_i$, a transmission path comprising a phase control module, and a power stage at the output of which a radiating element is arranged, comprising at least: a voltage modulator located upstream of the power stage of each of the radiating elements, a control device transmitting a PWM drain voltage control signal configured so as to manage the gain of a power stage in accordance with a predefined first bias law and to control the phase applied to the drain of the power stage in accordance with a second bias law.

4 Claims, 2 Drawing Sheets

(58) Field of Classification Search
CPC ............ H01Q 3/40; H01Q 3/38; H01Q 21/22; H01Q 3/46; H01Q 1/26; H01Q 21/067; H01Q 21/205; H01Q 21/24; H01Q 21/061; H01Q 3/267; H01Q 3/247; H01Q 9/0414; H01Q 1/2283; H01Q 21/0006; H01Q 21/06; H04W 52/52; H04W 52/42; H04W 16/28; H04W 88/06; H04W 52/241; H04W 52/245; H04W 52/32; H04W 52/367; H04W 52/0261; H04W 52/0274; H04W 24/06; H04W 52/346

See application file for complete search history.

(56) References Cited

U.S. PATENT DOCUMENTS

| | | | |
|---|---|---|---|
| 2010/0128775 A1* | 5/2010 | Kim | H03F 3/245 |
| | | | 455/110 |
| 2012/0114083 A1* | 5/2012 | Chen | H03G 3/3042 |
| | | | 375/345 |
| 2017/0047924 A1 | 2/2017 | Jardel et al. | |
| 2017/0331532 A1* | 11/2017 | Le-Ngoc | H04B 7/0617 |
| 2019/0089070 A1* | 3/2019 | Zihir | H01Q 21/067 |
| 2019/0149386 A1* | 5/2019 | Qian | H03F 3/68 |
| | | | 375/298 |
| 2021/0399419 A1* | 12/2021 | Hayes | H01Q 1/42 |

* cited by examiner

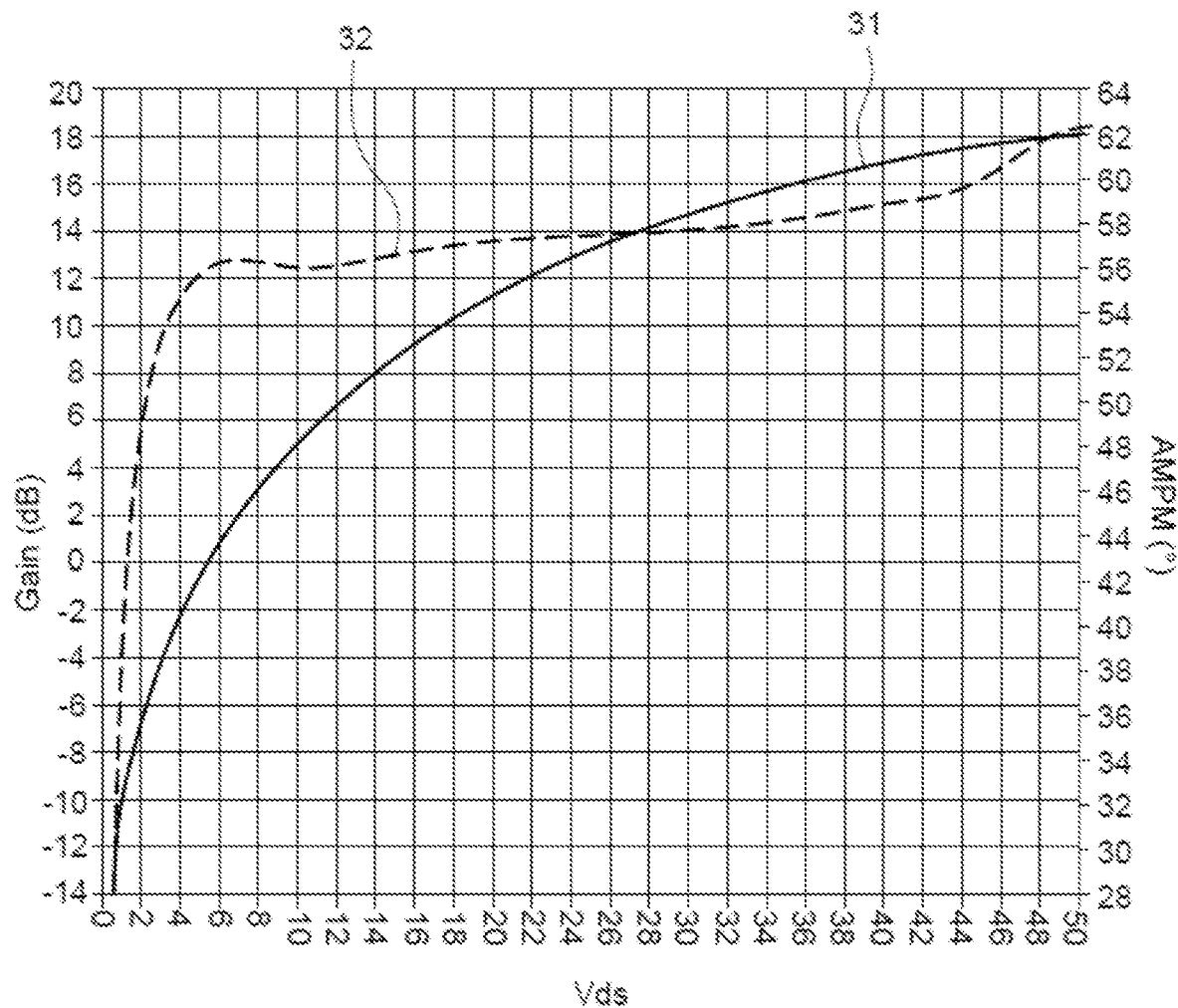

DEVICE FOR CONTROLLING A SCANNING ACTIVE ANTENNA

CROSS-REFERENCE TO RELATED APPLICATIONS

This application claims priority to foreign French patent application No. FR 2013956, filed on Dec. 22, 2020, the disclosure of which is incorporated by reference in its entirety.

FIELD OF THE INVENTION

The invention relates to a device for controlling an ultra-fast and high-efficiency scanning active antenna that is self-protected from interference, such as coupling effects linked to the antenna array, and/or mismatching effects linked to radiofrequency circuits.

BACKGROUND

The invention is applicable in all active antenna arrays, and therefore to all types of communication means using such antennas, microwave transmissions, cellular networks (5G) and any other high-frequency communication means, for example in a frequency range greater than a few GHz.

The active antenna principle is based on using an antenna array in which each active element is phase-controlled and amplitude-controlled in order to form a beam.

In the prior art known to the applicant, the amplitude of each active antenna element is controlled at input by an attenuator. The active element is therefore configured so as to make it possible to generate a peak power on all of the antenna elements forming the antenna array. To manage beamforming, not all of the antenna elements are programmed at their maximum power, the programming being dependent on the desired viewing angle. When an active element is configured so as to generate its maximum power but with control removed, the efficiency of this active element collapses. This therefore leads to relatively poor electrical efficiency of the antennas. To compensate for this efficiency, more energy for the active elements than necessary is used, for example. This proves to be a limiting factor in most uses of antennas, which are increasingly being integrated into devices.

The active antenna principle illustrated in FIG. 1 is based on an antenna array comprising n transmission paths Txi, where i=1, . . . , n. A transmission path $Tx_i$ comprises a resistive element $1_i$, a phase control module $2_i$, and a power transistor $3_i$ at the output of which a radiating element $E_i$ or active element of the antenna is arranged. Each active element $E_i$ is phase-controlled and amplitude-controlled in order to form the beams. The active elements (radiating elements) are positioned very close to one another. The mutual impedance applied to all of the radiating elements may lead to some of them becoming mismatched, possibly leading to premature ageing thereof, or even to destruction of their power amplifier.

Another solution consists in placing attenuators 4*i* (FIG. 1) at the output of a power transistor 3*i* in order to protect the power chains.

The aspects of electrical efficiency become a problem in the case of integrating active antenna arrays.

SUMMARY OF THE INVENTION

The idea of the present invention is to propose a system in which the phase control of the antenna elements is maintained, the amplitude of each active element is managed in terms of the voltage of the power element arranged at the output of the system, using an envelope tracking technique rather than managing this envelope via attenuators arranged upstream of the power stage, a technique which is normally used in the prior art.

The invention relates to a device for controlling a scanning active antenna comprising at least two transmission paths $T_{xi}$, each transmission path comprising a phase control module, and a power stage at the output of which a radiating element is arranged, characterized in that it comprises at least:

A voltage modulator located upstream of the power stage of each of the radiating elements, A control device configured so as to transmit a PWM drain voltage control signal configured so as to manage the gain of a power stage in accordance with a predefined first bias law and to control the phase applied to the drain of the power stage in accordance with a given second bias law.

The power stage is for example a power transistor, said modulator being designed to manage the drain voltage of the power transistor.

The first bias law for managing the gain of a stage and the second bias law for phase control are defined when the system is calibrated.

The control signal is for example determined taking into account the computation of the altitude and azimuth of the radiation desired at the antenna.

The radiating elements may be configured so as to operate in frequency bands above 800 MHz.

The radiating elements are for example configured so as to operate in the field of 4G/5G communications.

BRIEF DESCRIPTION OF THE DRAWINGS

Other features, details and advantages of the invention will become apparent from reading the description, given with reference to the appended drawings, which are given by way of non-limiting example and in which, respectively:

FIG. 3 shows an example of a bias law for the amplifier, which makes it possible to manage the gain thereof on the basis of the drain voltage, and of a bias law for controlling the phase on the basis of the drain voltage.

DETAILED DESCRIPTION

Active antenna systems use uniformly distributed active modules, each of these modules notably comprising a high-frequency power amplifier (HPA) used for transmission. Each active module transmits a portion of the power needed by the antenna system to provide a given range status. The various transmission sources are summed coherently in an antenna array comprising a large number of sources. With all of the active modules being identical, it is generally sought to optimize efficiency and range status by making the power amplifiers operate in saturated mode, that is to say at maximum power.

The idea of the present invention is to integrate, directly into the power stage, a voltage modulator in each active cell of the antenna array. The voltage modulator notably has the role of managing the transmission power of each of the active elements in terms of the drain voltage of the power transistor, thus making it possible to reach a unitary optimum efficiency and therefore a global optimum efficiency for the antenna array. The corollary effect is that of increasing the efficiency of each amplifier when these are used below their saturated power, and therefore of reducing the overall consumption of the active antenna in comparison with the current prior art. In addition, using the very fast voltage modulator, such as the one disclosed in patent application WO2020016305, makes it possible to control the gain of the power amplifiers more quickly, by a factor of at least 100 in comparison with the current prior art. This enables additional functionalities for the active antenna, such as dynamic target tracking, or instantaneous communication with two different targets.

Figure 1:
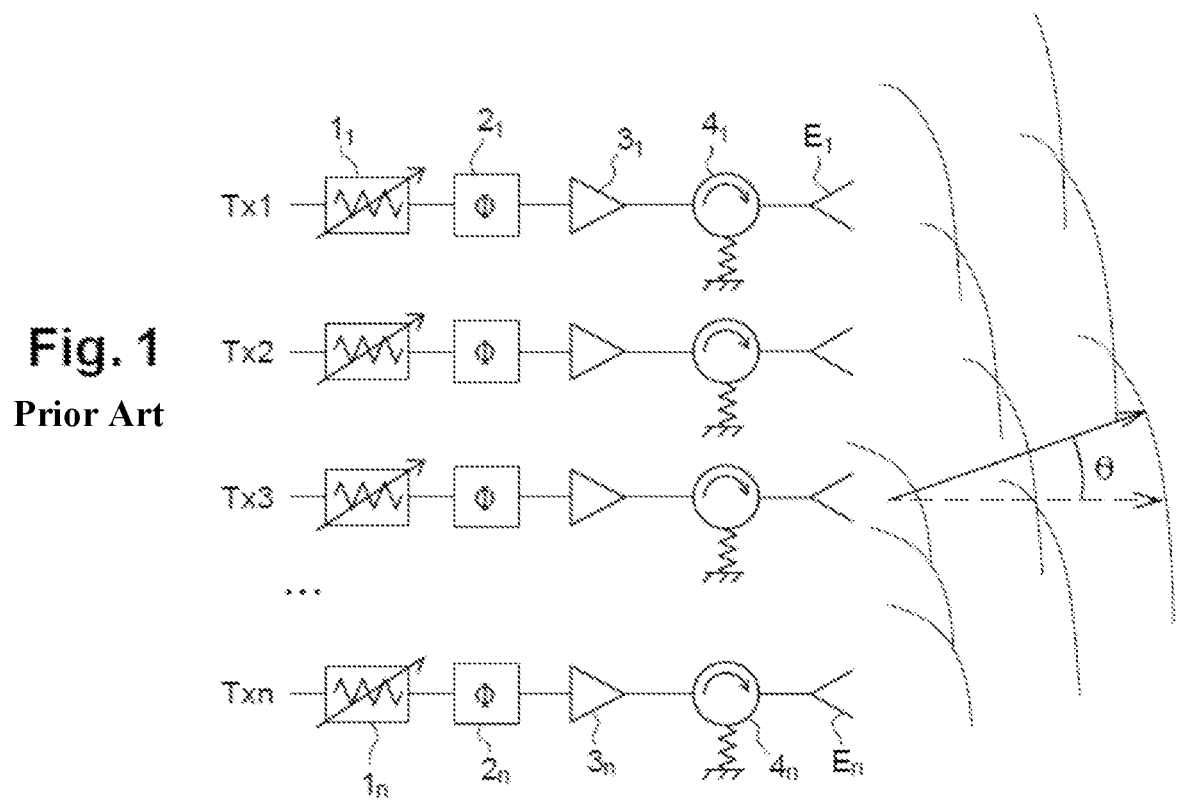
FIG. 1 shows an example of an architecture according to the prior art.
Figure 2:
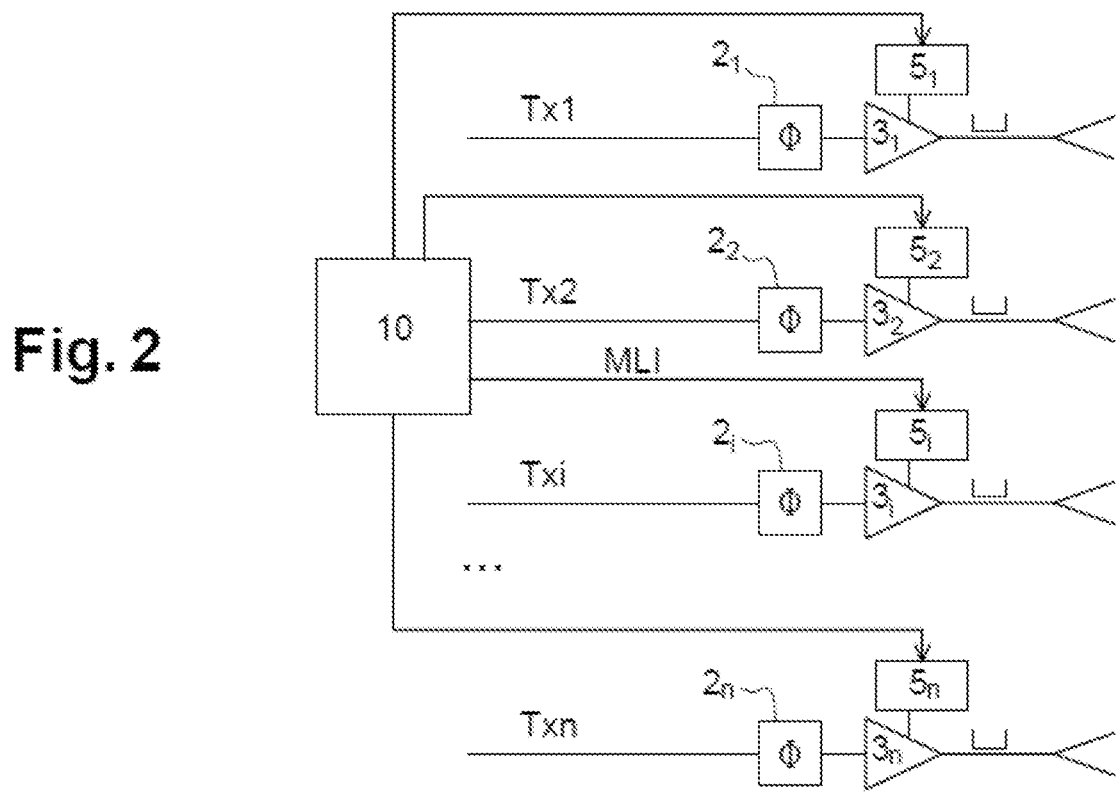
FIG. 2 shows an example of a system according to the invention.

FIG. 2 illustrates an example of an architecture according to the invention, in which the elements of FIG. 2 in common with those of the system described in FIG. 1 bear the same references.

The system comprises a set of n active antenna elements: $E_i = E_1, \ldots E_n$.

A transmission chain Txi comprises a phase adjustment device $2_i$ positioned upstream of an amplifier $3_i$, which is itself located upstream of an active antenna element.

An ultra-fast device $5_i$ for modulating the drain voltage is connected to the output amplifier $3_i$. A PWM control signal generated by a control device 10 is sent to this drain voltage modulation device in order to manage the gain of the output amplifier and thus improve the pointing of the active antenna. The control device is also configured so as to control the phase applied to the drain of the amplifier. The speed of the drain voltage control system makes it possible to reconfigure the antenna with a far greater speed (at least 10 times faster) than systems known from the prior art.

FIG. 3 gives an example of bias laws implemented by the control device 10. A bias law for the amplifier (FIG. 3) is implemented in an FPGA (field-programmable gate array) programmable logic circuit or ASIC (application-specific integrated circuit) integrated circuit. The bias law is extracted when the antenna system is calibrated and makes it possible to accurately ascertain the gain G of the amplifier on the basis of the drain voltage Vds applied thereto (FIG. 3). The curve 31 corresponds to the bias law that makes it possible to manage the gain G of the amplifier on the basis of the drain voltage, and the curve 32 corresponds to the control of the phase φ on the basis of the drain voltage Vds of the power amplifier. The aim is to remain within a phase variation less than 5° in order to control the antenna correctly.

This novel way of controlling the output power of a power amplifier by varying its gain through the applied drain voltage is not used in the prior art. The output power of each amplifier is usually adjusted on the basis of its input power applied thereto.

The extracted bias law is used to compute the drain voltage to be applied to each power amplifier forming the active antenna for an azimuth and altitude configuration of the antenna.

An analogue PWM signal carrying the information about the voltage to be applied to each amplifier is sent to the drain voltage modulation circuit. This signal is computed in relation to the altitude and azimuth computation for the desired radiation of the antenna.

The self-protection circuit described in patent FR3134972 may be positioned at the output of each power amplifier so as to make it possible to protect each element from excessive mismatching. This circuit may be coupled to the novel very fast active antenna architecture.

The invention applies in the field of active antennas operating in frequency bands above 800 MHz, Satcom, 4G/5G networks, etc.

The prior art uses a fixed bias on each amplifier, thereby causing consumption losses when these are not used at full power. By proceeding with the method according to the invention, there is a dual gain on the system: a gain in terms of consumption when the amplifiers are used below their maximum power and a gain in terms of the radiation pattern, which becomes more directional by virtue of optimizing the amplitude on each amplifier.

The use of this novel architecture also allows much faster control of the pointing/depointing of the antenna (at least ten 10 times faster). This allows much more effective target tracking, and also opens up the possibility of tracking and interacting with multiple targets almost instantaneously.

The invention claimed is:

1. A device for controlling a scanning active antenna comprising at least two transmission paths, each of the transmission paths comprising a phase control module and a power output amplifier, wherein a radiating element is arranged at an output of each power output amplifier, the device comprising:
   at least two voltage modulators, each voltage modulator configured to modulate a drain voltage of one of the power output amplifiers; and
   a control device transmitting to the at least two voltage modulators modulating the drain voltage of each output amplifier a respective pulse width modulation signal computed in relation to an altitude and azimuth computation for a desired radiation of the scanning active antenna to manage a gain of each power output amplifier in accordance with a predefined first bias law, a phase applied to the drain of each power output amplifier being controlled in accordance with a second bias law.

2. The device according to claim 1, wherein the predefined first bias law for managing the gain and the second bias law for phase control are defined when the scanning active antenna is calibrated.

3. The device according to claim 1, wherein the scanning active antenna is configured so as to operate in frequency bands above 800 MHz.

4. The device according to claim 1, wherein the scanning active antenna is configured so as to operate in the field of 4G/5G communications.

* * * * *